(12) United States Patent
Balatsos et al.

(10) Patent No.: US 7,904,838 B2
(45) Date of Patent: Mar. 8, 2011

(54) CIRCUITS WITH TRANSIENT ISOLATION OPERABLE IN A LOW POWER STATE

(75) Inventors: Aris Balatsos, Toronto (CA); Charles Leung, North York (CA); Siva Raghu Ram Voleti, Andhra Pradesh (IN)

(73) Assignee: ATI Technologies ULC, Markham, Ontario (CA)

( * ) Notice: Subject to any disclaimer, the term of this patent is extended or adjusted under 35 U.S.C. 154(b) by 631 days.

(21) Appl. No.: 11/839,245

(22) Filed: Aug. 15, 2007

(65) Prior Publication Data
US 2009/0049321 A1 Feb. 19, 2009

(51) Int. Cl.
G06F 17/50 (2006.01)
G06F 9/45 (2006.01)

(52) U.S. Cl. ............ 716/1; 716/2; 716/4; 716/5; 716/18; 700/11; 700/12; 700/22; 700/23; 712/32; 712/33; 712/34; 712/35; 713/300; 713/310; 713/320; 713/321; 713/323; 713/324

(58) Field of Classification Search .................. 716/1–5, 716/18; 700/11–12, 22–23; 712/32–35; 713/300–324
See application file for complete search history.

(56) References Cited

U.S. PATENT DOCUMENTS

| | | | |
|---|---|---|---|
| 5,598,364 A | 1/1997 | McCall et al. | |
| 6,091,261 A | 7/2000 | De Lange | |
| 6,480,817 B1 | 11/2002 | Peters et al. | |
| 6,883,152 B2 | 4/2005 | Bednar et al. | |
| 6,924,661 B2 * | 8/2005 | Buffet et al. | 326/38 |
| 6,977,833 B2 * | 12/2005 | Day et al. | 365/52 |
| 7,080,341 B2 * | 7/2006 | Eisenstadt et al. | 716/13 |
| 2005/0184758 A1 | 8/2005 | Hoberman et al. | |

OTHER PUBLICATIONS

Chandran, Ravi, "Power Dissipation in High-End Integrated Communication Processors", Electrical Design News, May 25, 2006, pp. 63-69, Available online: <http://www.edn.com/article/CA6335307.html>.
Kumar, Udhaya, "Simulation Mismatches Can Foul Up Test-Pattern Verification", Electronic Design, Aug. 4, 2005, Penton Media Inc., Available online: <http://electronicdesign.com/Articles/Index.cfm?ArticleID=10821>.
Kim, Nam Sung et al., "Leakage Current: Moore's Law Meets Static Power", Dec. 2003, pp. 68-75, IEEE Computer Society.

* cited by examiner

*Primary Examiner* — Nghia M Doan
(74) *Attorney, Agent, or Firm* — Vedder Price P.C.

(57) ABSTRACT

An integrated circuit includes a core-logic providing a core-logic output, a latch in communication with the core-logic to store a state of the core-logic output, and an isolation circuit for selectively interconnecting the core-logic output to an input of the latch. The circuit also includes and a power consumption controller in communication with the core-logic, the latch and the isolation circuit, for controlling the latch to store a state of the core-logic output, and output a corresponding signal. The controller is further operable to signal the isolation circuit to isolate the core-logic output from the latch by providing an output corresponding to pre-determined value and transition the core-logic from a high power state and a low power state. This prevents transient signals from propagating to interconnected circuit blocks and external devices.

23 Claims, 6 Drawing Sheets

CIRCUITS WITH TRANSIENT ISOLATION OPERABLE IN A LOW POWER STATE

FIELD OF THE INVENTION

The present invention relates generally to power management in circuits and more particularly to integrated circuits in which idle parts of a circuit maybe shut down and powered back as needed, while active parts remain powered; and any resulting spurious or transient signals are suppressed.

BACKGROUND OF THE INVENTION

Modern circuit designs attempt to reduce power consumption. Power consumption is especially of concern in electronic devices that are intended for mobile use such as handheld devices such as video games, personal digital assistants, global positioning satellite receivers, as well as portable computers and wireless handsets. Since mobile devices typically operate using battery power, it is important to conserve power by limiting its dissipation whenever possible.

Examples of circuits in which power consumption considerations are important include graphics chips used in portable or laptop computers. Clearly, power consumption can be reduced by minimizing the number of components used in a given electronic device. Moreover, parts of a circuit may not be needed by an electronic device even when it is powered on. Therefore, power consumption can further be reduced by shutting down inactive parts, even while other parts are powered.

In graphics chips, for example, separate power supply pins may be available for the functional logic (referred to as core-logic) and the drivers for the input/output (I/O) pads. Therefore the core-logic may be shut down when not in use, while the I/O drivers continue to be powered.

Two types of power consumption called dynamic power consumption and static power consumption are typically considered. Dynamic power consumption results primarily from the switching of logic gates and the attendant charging and discharging of capacitors. In contrast, static power consumption is primarily caused by leakage current.

Although dynamic power consumption has been the focus of power reduction efforts for decades, shrinking die sizes and increasing number of transistors in newer manufacturing technologies, such as 0.1 micron and smaller technologies, have made static power dissipation equally important.

As static power dissipation is caused by leakage current, it cannot be materially reduced by reducing switching. However, shutting down inactive component helps in its reduction.

Unfortunately, shutting down parts of a circuit, and powering them back may cause spurious transient signals (called "glitches") on electrical interconnections to internal circuit blocks, or interconnected external components.

For example, transient voltage signals may be observed on signal lines interconnected to the I/O pads of an integrated circuit when its core-logic is shut down first and then powered back up. This in turn may interfere with the operation of other interconnected integrated circuits.

Accordingly, there is a need for better circuit designs that reduce static power dissipation while reducing undesirable spurious signals which may affect the performance of interconnected components.

SUMMARY OF THE INVENTION

In accordance with one aspect of the present invention, there is provided an integrated circuit including a core-logic, an isolation circuit, a latch and a controller. The core-logic provides a core-logic output. The isolation circuit is in communication with the core-logic and is operable to selectively provide an output corresponding to one of the core-logic output and a predetermined value. The latch is interconnected to the isolation circuit, and receives the output of the isolation circuit. The power consumption controller is in communication with the core-logic, the latch and the isolation circuit. The controller is operable to control the latch to store a value of the core-logic output and provide a corresponding output, control the isolation circuit to provide an output corresponding to the predetermined value at the output of the isolation circuit, and transition the core-logic from a high power state to a low power state.

In accordance with another aspect of the present invention, there is provided a method of operating an integrated circuit that includes a core-logic providing a digital signal, a latch in communication with the core-logic to store the state or level of the digital signal; and an isolation circuit operable to selectively provide the digital signal to an input of the latch. The method includes signaling the latch to store the state the digital signal, signaling the isolation circuit to provide a predetermined signal to the input of the latch, and removing power supplied to at least a portion of the core-logic, thereby placing the integrated circuit into a lower power state.

In accordance with another aspect of the present invention, there is provided a method of operating an integrated circuit including a core-logic providing a core-logic output to an isolation circuit. The isolation circuit is operable to selectively provide an output corresponding to one of the core-logic output and a predetermined value, to an input of a latch. The input of the latch is interconnected with an output of the isolation circuit. The method includes signaling the latch to store a value of the output of the isolation circuit corresponding to the core-logic output, and provide a corresponding output; signaling the isolation circuit to provide an output corresponding to the predetermined value; and removing power supplied to at least a portion of the core-logic thereby placing the integrated circuit in a low power state.

In accordance with yet another aspect of the present invention, there is provided an integrated circuit including a controller in communication with an isolation circuit and a latch. The isolation circuit includes a first input, a second input and an output for selectively providing an output signal corresponding to an input signal received at the first input or a predetermined signal value, in response to a signal received at the second input. The latch includes a data input interconnected to the output of the isolation circuit for receiving a data signal, a control input for receiving a control signal and an output. The controller is operable to assert the control signal to control the latch to store a value of the data signal, and output a corresponding signal. The controller is also operable to signal the isolation circuit to provide an output signal corresponding to the predetermined signal value.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
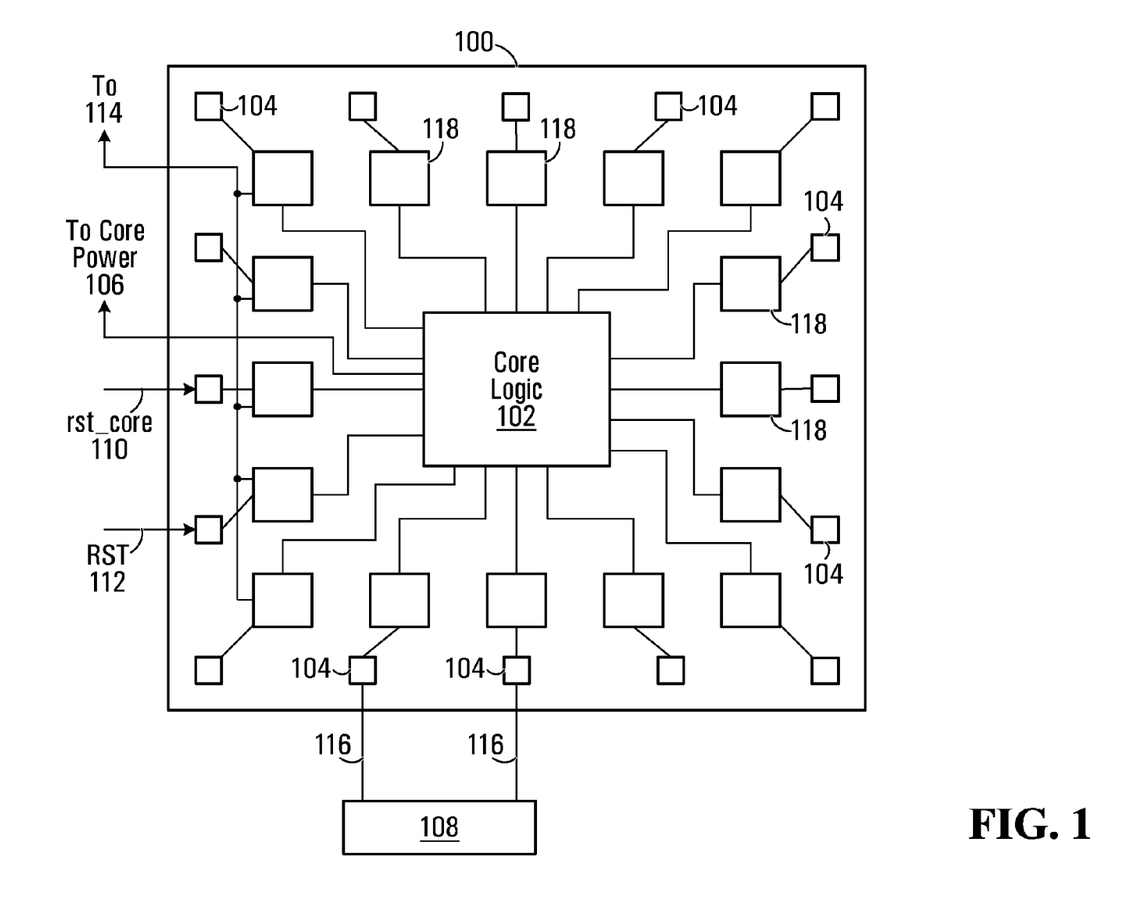
FIG. 1 is a simplified schematic block diagram of a conventional integrated circuit (IC) including core-logic and input-output (I/O) pads.

FIG. 1 is a schematic diagram of a conventional integrated circuit (IC) 100 including a core-logic 102 and input-output (I/O) pads 104 and I/O drivers 118. A power input 106 supplies power to core-logic 102. A separate power supply input 114 provides power to I/O drivers 118. I/O pads 104 are interconnected to I/O drivers 118 which further interconnect core-logic 102. The core-logic refers to the implementation of the specific logic that carries out all the functional requirements of the design, excluding generic circuitry such as I/O drivers/buffers, and power supply pins. An external device 108 may be interconnected to some of I/O pads 104 of circuit 100 via lines 116 which may form part of a bus. External device 108 may be a peripheral device.

A device reset input 112 accepts a reset signal used to reset circuit 100. The device reset signal may be initiated by a host processor. A separate reset input 110 is used to receive a reset signal to reset core-logic 102 only, without resetting I/O pads 104.

In operation, power supplied to core-logic 102 through power supply input 106 may be turned off when core-logic 102 is idle, while I/O drivers 118 interconnecting I/O pads 104 are still powered through a separate power supply input 114. However, when core-logic 102 is powered again, external devices connected to I/O pads 104 of circuit 100, such as device 108, may be subject to transient voltages on lines 116. Transient voltages are undesirable as they lead to unpredictable behavior in circuits and may potentially cause damage.

Figure 2:
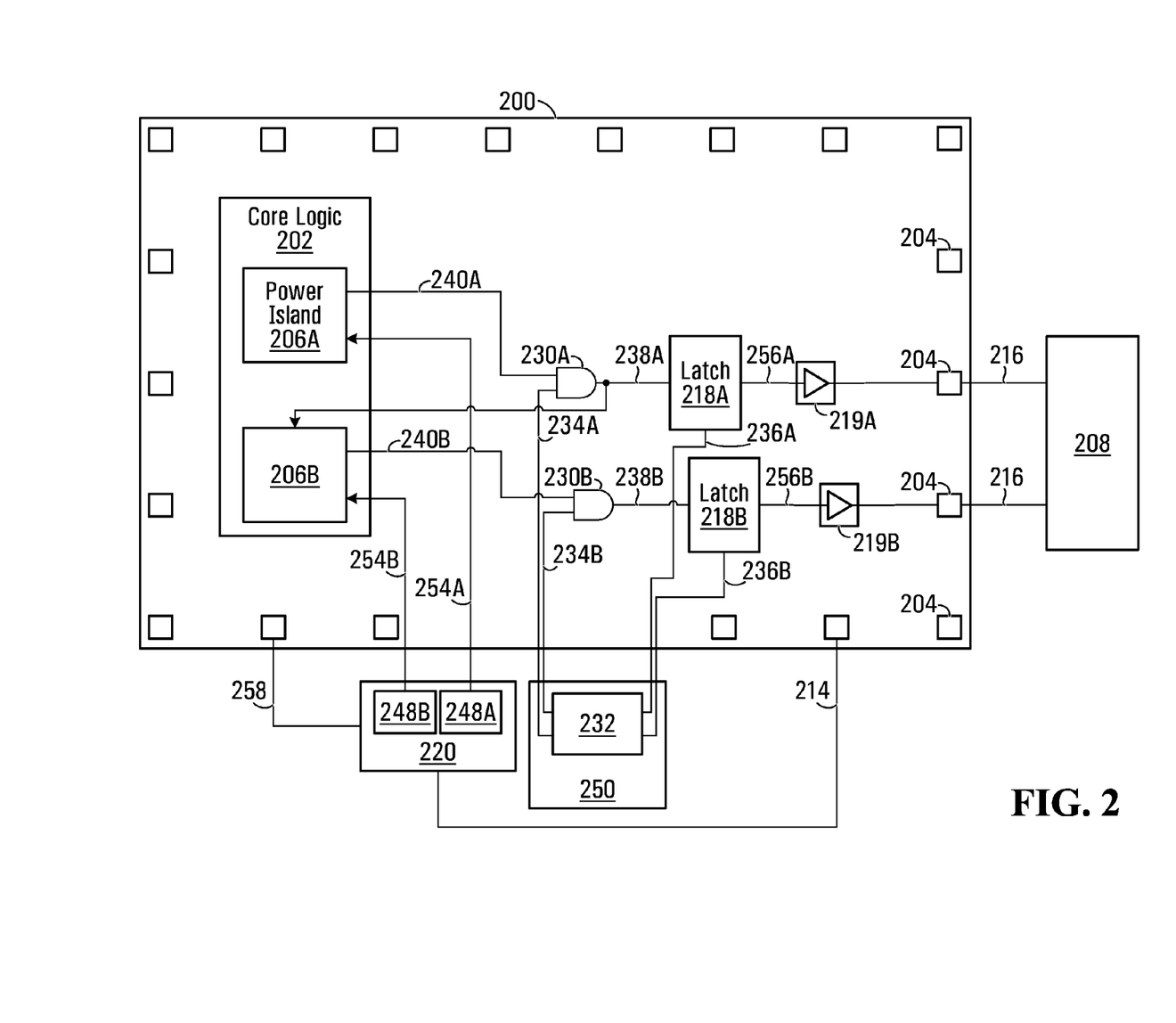
FIG. 2 is a simplified schematic diagram of an integrated circuit, exemplary of an embodiment of the present invention, including a core-logic with one or more power-islands, I/O drivers and I/O pads.

Accordingly FIG. 2 is a schematic diagram of an integrated circuit 200, exemplary of an embodiment of the present invention. Integrated circuit 200 includes core-logic 202 and I/O pads 204. Core-logic 202 may include one or more power-islands 206A, 206B (individually and collectively power-islands 206). Power-islands 206 are sometimes called voltage-islands. Only two power islands 206 are illustrated. Of course, integrated circuit 200 may have many more such islands. Each power-island may consume differing amounts of dynamic and static power. In addition, each power-island may be operated at different power supply input voltage levels. Alternatively, the entirety of core-logic 202 could be a single power island.

Each power-island 206 is an individually powered block within core-logic 202. Power is supplied to power-islands 206A, 206B from power source 220 through power supply inputs 254A, 254B (individually and collectively inputs 254) respectively. In this way, power-islands 206 may be independently powered up and down, as practicable.

At least some outputs of core-logic 202 (or alternately at least some outputs of power-islands 206A, 206B) are interconnected to isolation circuits or isolation cells 230A, 230B (individually and collectively isolation cells 230). The outputs of isolation cells 230A, 230B interconnect latches 218A, 218B (individually and collectively latches 218) through signal lines 238A, 238B (individually and collectively signal lines 238) respectively. Latches 218A, 218B interconnect I/O drivers 219A, 219B (individually and collectively I/O drivers 219) through signal lines 256A, 256B (individually and collectively signal lines 256). I/O drivers 219 interconnect individual I/O pads 204, and may be implemented using non-inverting CMOS buffers.

Outputs of core-logic 202 interconnect one input of an isolation circuit or isolation cell 230A, 230B through signal lines 240A, 240B (individually and collectively signal lines 240) respectively. Signal line 240 carries a core-logic output—a digital signal provided by core-logic 202. Signal line 240 may be a data line, or a control line such as for example, an output-enable line or a strength line used to control I/O driver 219.

Of course, there need not be a one-to-one correspondence between isolation cells 230, latches 218, and power-islands 206. Instead, each power-island 206 may have multiple outputs, feeding multiple isolation cells 230 and latches 218.

Isolation-control lines 234A, 234B (individually and collectively isolation control lines 234) interconnect a control block 232 to an input of isolation cells 230A, 230B. The output of isolation cell 230A is interconnected to a latch 218A (through a signal line 238A), and may also be connected the other power-islands in core-logic 202. Similarly the output of isolation cell 230B is interconnected to a latch 218B through a signal line 238B. Each of isolation cells 230A, 230B is thus operable to selectively interconnect an output signal from core-logic 202, to an input of a corresponding one of latches 218A, 218B respectively.

Outputs of latches 218A, 218B are interconnected I/O drivers 219A, 219B which further interconnect I/O pads 204. Latch 218 may be a D-latch or other suitable latch. Latch-enable inputs (control inputs) for latches 218A, 218B interconnect control block 232 through control signal lines 236A, 236B (individually and collectively signal-lines 236) respectively.

A data input of latch 218 interconnects the output of isolation cell 230 through signal line 238. I/O pads 204 interconnect an external device 208 though signal lines 216. As will be appreciated, latch 218 is an asynchronous circuit. For example, when the latch-enable input of a latch 218 (e.g. a D-latch) is high, then the output of the latch simply follows its data input. However, the output of latch 218 will not respond to a signal input if its latch-enable input (interconnected to control block 232 in FIG. 2) is low—it simply stays latched in its last state. In other words, the output of latch 218 remains unchanged while the level of the signal supplied to its latch-enable input is low.

Controller 250, which includes control block 232, is a power consumption controller operable to transition core-logic 202 between at least one higher power state and a lower power state as needed. Controller 250 may include a processor and may optionally incorporate power source 220. Controller 250 may for example, be a dedicated power controller, or may be a general purpose central processor operating under software control. Controller 250 or control block 232 under the control of controller 250, may selectively transition any given power-island 206 from a low power state to a high power state or vice versa. In the depicted embodiment controller 250 and control block 232 are formed external to circuit 200. Of course, controller 250 and/or control block 232, or portions thereof may be formed as voltage islands on circuit 200.

Power may be supplied to power-islands 206 in core-logic 202 using power input 254A, 254B. The power supplied may originate in a controllable power source 220. Power source 220 may include a field-effect-transistor (FET) for shared power input. The FET (not shown) in power source 220 may be a metal-oxide-semiconductor FET (MOSFET) with low resistance when the transistor is in its on state. If power to input 254 is not shared, power source 220 may be a DC-to-DC converter or some other controllable power source under the control of controller 250.

Lines 216 provide electrical interconnection of I/O pads 204 to external devices, such as device 208. Power input 214 supplies power to active components interconnecting core-logic 202 to I/O pads 204, including I/O drivers 219, isolation cells 230 and latches 218.

Control signal line 236 interconnects the control input of latches 218 to core-logic control block 232.

Power-island 206A may be turned on and off independently from the rest of core-logic 202, through its power supply input 254A. Similarly, power-island 206B may be turned on and off separately from the rest of core-logic 202, through its own power supply input 254B. Power control switches 248A, 248B (individually and collectively power control switches 248) of power supply 220 may be used to control power supplied to power-islands 206A, 206B respectively, by control block 232, or controller 250. A signal line 258 may be used to interconnect circuit 200 to power source 220 to allow circuit 200 to control power source 220 if needed. Alternately, power control switches 248 may reside inside circuit 200 rather than power source 220.

Figure 3:
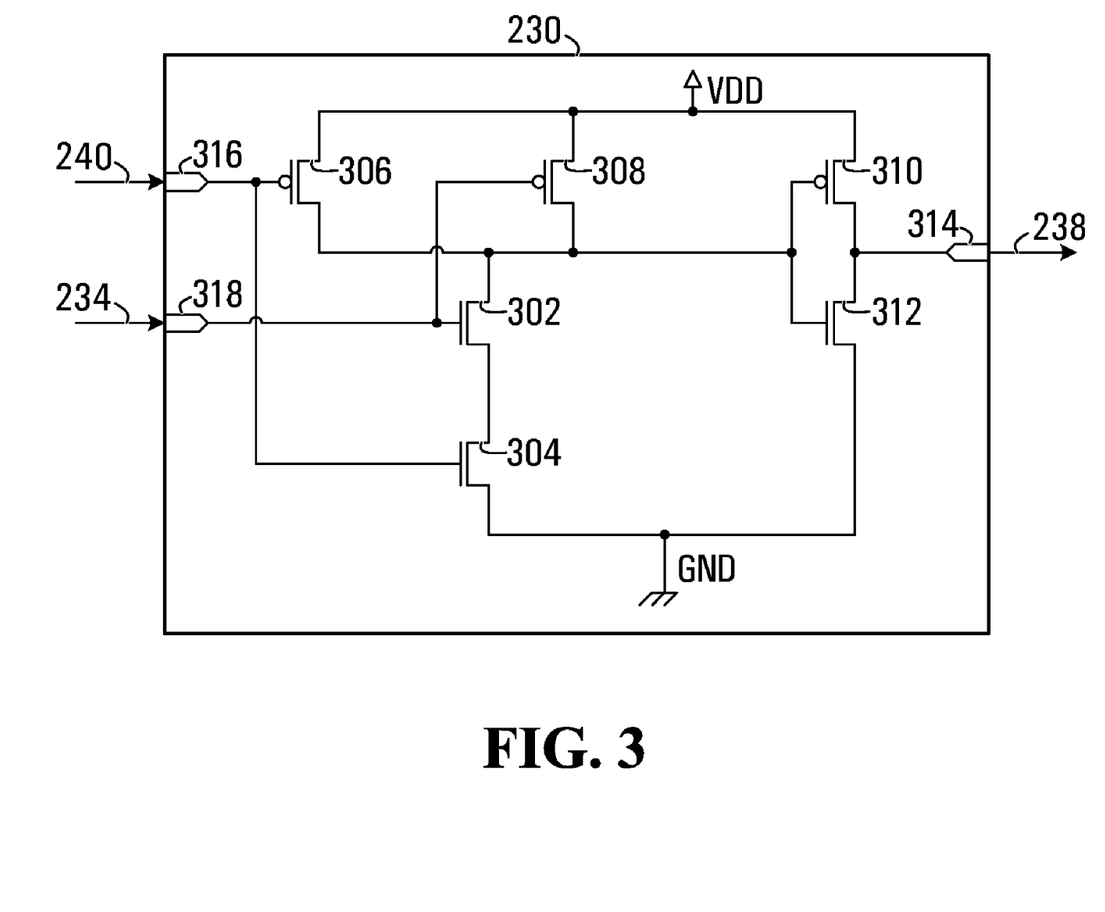
FIG. 3 is a schematic diagram of the isolation cell of FIG. 2 implemented using complimentary-metal-oxide semiconductor (CMOS) transistors.

In one exemplary embodiment, isolation cell 230 may be an AND-gate implemented using CMOS logic. FIG. 3 depicts one exemplary isolation cell implemented as an AND-gate constructed using CMOS transistors 302, 304, 306, 308, 310, 312. NMOS transistors 302, 304 and p-type metal oxide semiconductor (PMOS) transistors 306, 308 form a NAND gate stage, which is followed by an inverter stage formed by PMOS transistor 310 and n-type metal oxide semiconductor (NMOS) transistor 312 to realize a CMOS AND-gate. A signal input 316 may interconnect signal line 234 (FIG. 2), while a control input 318 interconnects signal line 240 (FIG. 2), and output 314 may interconnect signal line 238 (FIG. 2).

Isolation cell 230 is thus produces a predetermined signal value or level (high or low) in response to a control input. However isolation cell 230 may additionally include built-in state storage elements such as a latch in alternate embodiments. Moreover, in multiple voltage-island circuits (that is, circuits in which individual islands may be operated using different supply voltage levels), isolation cell 230 can include voltage level-shifters.

A LATCH_ENABLE signal on control signal line 236 may be transmitted to latch 218 to signal it to store the value (last known state) of outputs from core-logic 202 (and hence I/O pads 204), prior to transitioning to a low power state. When power-islands 206 are shut down or powered up, signal levels on signal lines 240 may be unknown. As noted, this is a potential source of undesirable transient signals observed on I/O pads (or I/O glitches). Thus, as noted below, isolation cell 230 and latch 218 may be used to eliminate the propagation of such signals when entering or exiting low power states in circuit 200.

In operation, as power is disconnected from at least a portion of core-logic 202 (e.g. from power-island 206A (or 206B)), isolation cell 230A (or 230B) under the control of control block 232 may isolate potentially indeterminate signals on line 240A (or 240B) and instead output a known predefined signal level (i.e., high or low). This prevents an undesirable transient voltage signal originating in a power-island from propagating to interconnected external devices or other power-islands (FIG. 2). Thus isolation cell 230 when signaled by a control signal on line 234, receives the output of power-island 206 (which may be a transient voltage signal) but nonetheless outputs a known predetermined signal level associated with either logic high or low. To achieve this, an isolation control signal is sent to isolation cell 230 on line 234 by control block 232.

In one exemplary embodiment, control block 232 may drive the isolation signal on isolation-control line 234 low, which leads the AND-gate (isolation cell 230) to clamp low or to output a signal level corresponding to logic low on line 238. Alternately, an OR-gate may be used to clamp high (output a signal level corresponding to logic high on line 238). As may be appreciated by a person skilled in the art, other suitable gates may be used to form isolation cell 230.

Static power conservation in circuit 200 may be accomplished by disconnecting power applied to some or all power islands in core-logic 202. If no power is supplied to a given power-island, then neither dynamic power nor static power would be consumed inside that power-island. If power is disconnected from all of core-logic 202, circuit 200 is said to be operating in a floating core mode.

During normal (or high power state) operation, the signal on line 236 may be de-asserted making latch 218 transparent so that the output of latch 218 follows its input. However, before turning off power to a voltage island 206 to transition to a low power state, the last known signal values (or the state) of outbound signals destined for I/O pads 204 should be latched or buffered.

Latches 218 interconnecting signal lines 238 are used for storing the last known signal levels of outbound signals. Accordingly, a control signal on lines 236 may be asserted to latch each signal on line 238 on a corresponding latch 218, before turning off power to core-logic 202. When the signal is asserted on lines 236, latches 218 are no longer transparent and thus retain signal levels on lines 238 at the time of assertion of the signal. When power to core-logic 202 is subsequently cut off, I/O pads 204 maintain their last known values since stored signal levels in latches 218 are maintained in electrical communication with I/O pads 204 through I/O drivers 219.

Before transitioning circuit 200 to a low power state, as noted above, controller 250 may stop all operations including I/O operations so that circuit 200 is idle. Controller 250 may then control latch 218 by asserting a LATCH_ENALBE signal on line 236 to latch the state (store the value) of an I/O pad interconnected to the output of latch 218. State information, such as controller register values and strap information, may be stored in storage outside core-logic 202, which may be a volatile memory such as a block of random access memory (RAM) or non-volatile memory such as flash memory. Strap information includes configuration data need by core-logic 202 before normal operation starts, such as bus mode of any interconnected bus, clock source and the like.

Once core-logic 202 is idle and any desired control information is stored, controller 250 though control block 232 may control isolation cell 230 by asserting a signal on isolation-control line 234 so that isolation cell 230 outputs a known, predetermined signal value. If signal on isolation-control line 234 is set high and isolation cell 230 is an AND-gate, then isolation cell 230 would be transparent; that is, the output of line 238 is the same as the signal on line 240. Conversely if signal on isolation-control line 234 is set low then the isolation cell 230, the output of line 238 is also low.

After I/O pad values are stored, and isolation cells 230 have clamped the output signal on lines 238, power to core-logic 202 (i.e., to all of the power islands) may be removed. Thus controller 250 transitions core-logic 202 to a low power state by removing power to core-logic 202. Power to isolation cell 230, latch 218 and I/O drivers 219, continues to be supplied even when core-logic 202 is disconnected from its power supply.

Circuit 200 may also be operated in a low power state, by disconnecting power to some power-islands while other power-islands are powered. As noted, a power-island 206 is an individually powered block within core-logic 202 with its own power supply input, and may be shut down without causing power interruption to other power-islands. In circuit 200 each power-island 206 has its own power input 254. Power supplied to power power-islands 206A, 206B at inputs 254A, 254B may be controlled by controller 250 (or control block 232) through power control switches 248A, 248B respectively. Control block 232 may thus manage power input to individual power-islands 206A, 206B in core-logic 202. In the depicted embodiment, control block 232 is under the control of controller 250 although this not required in general.

If power supplied to power-island 206A is disconnected, leakage current and thus static power dissipation are eliminated in power-island 206A. The rest of core-logic 202 including power-island 206B however, remains powered and may continue to operate. Thus, while one power-island is shutdown, other power-islands and the rest of core-logic 202 may continue to operate and dissipate some static and dynamic power.

Figure 4:
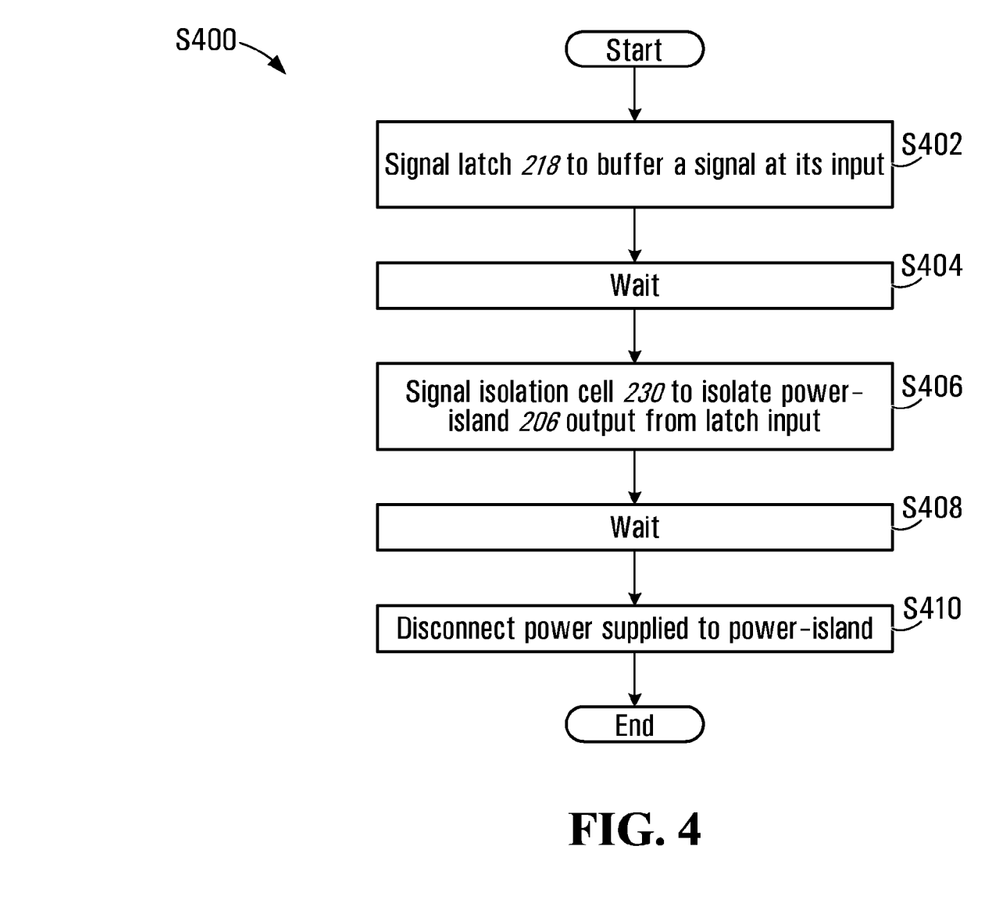
FIG. 4 is a flowchart illustrating steps taken by the controller of FIG. 2 to transition a power-island from a high power state to a low power state.

FIG. 4 is a flowchart depicting steps S400 taken by controller 250 to transition circuit 200 from a high power state to a low power state. As depicted controller 250 signals latch 218A to store the logical state (1 or 0) of a signal on line 238A at its input (S402). After some time (S404) controller 250 signals isolation cell 230A to isolate the output of power-island 206A from the input of latch 218 (S406). After another delay (S408) controller 250 disconnects power supplied to power-island 230A by signaling power source 220 (S410).

Figure 5:
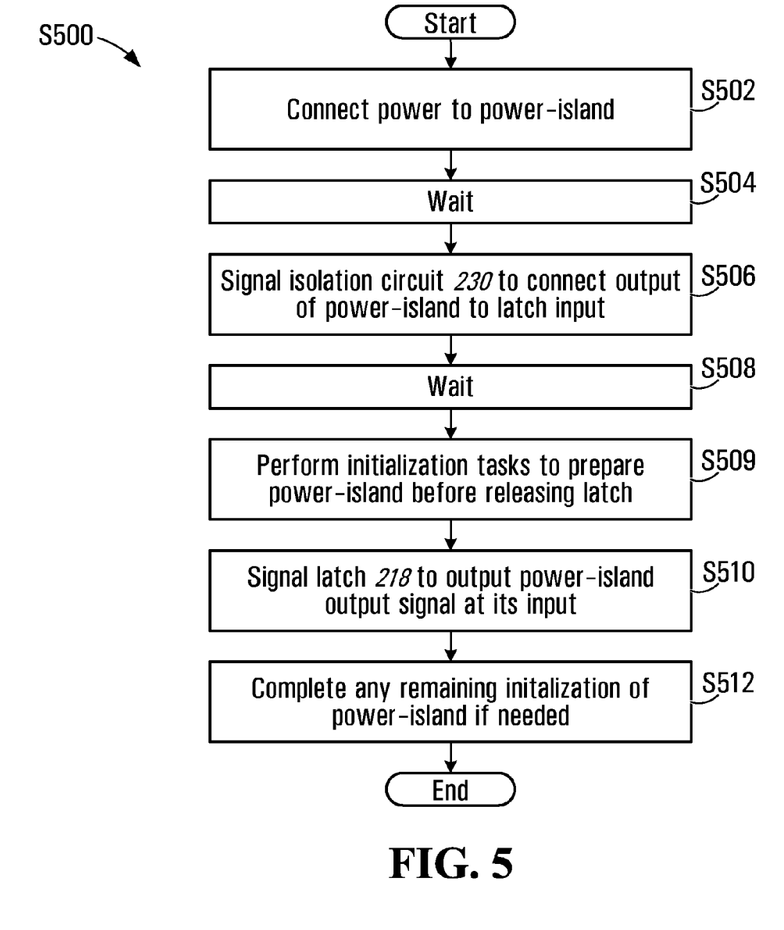
FIG. 5 is a flowchart illustrating steps taken by the controller of FIG. 2 to transition a power-island from a low power state back to a high power state.

Conversely, FIG. 5 is a flowchart depicting steps S500 taken by controller 250 to transition power-island 206A from a low power state, back to a high power state. As depicted controller 250, through power source 220, connects power to power-island 230A (S502) thereby transitioning core-logic 202 from a low power state to a high power state. After some delay (S504), controller 250 signals (controls) isolation circuit 230A to output the output of the interconnected power-island 206A (S506). After another delay (S508), and an optional initialization step for performing configurations of power-island 206A (S509), controller 250 signals (controls) latch 218A (through signal line 234A) to output the signal value on line 240A (i.e., the output of power-island 206A) to complete the transition to high power state operation. Any remaining initializations that need not be performed prior to releasing latch 218A may then be undertaken (S512).

Figure 6:
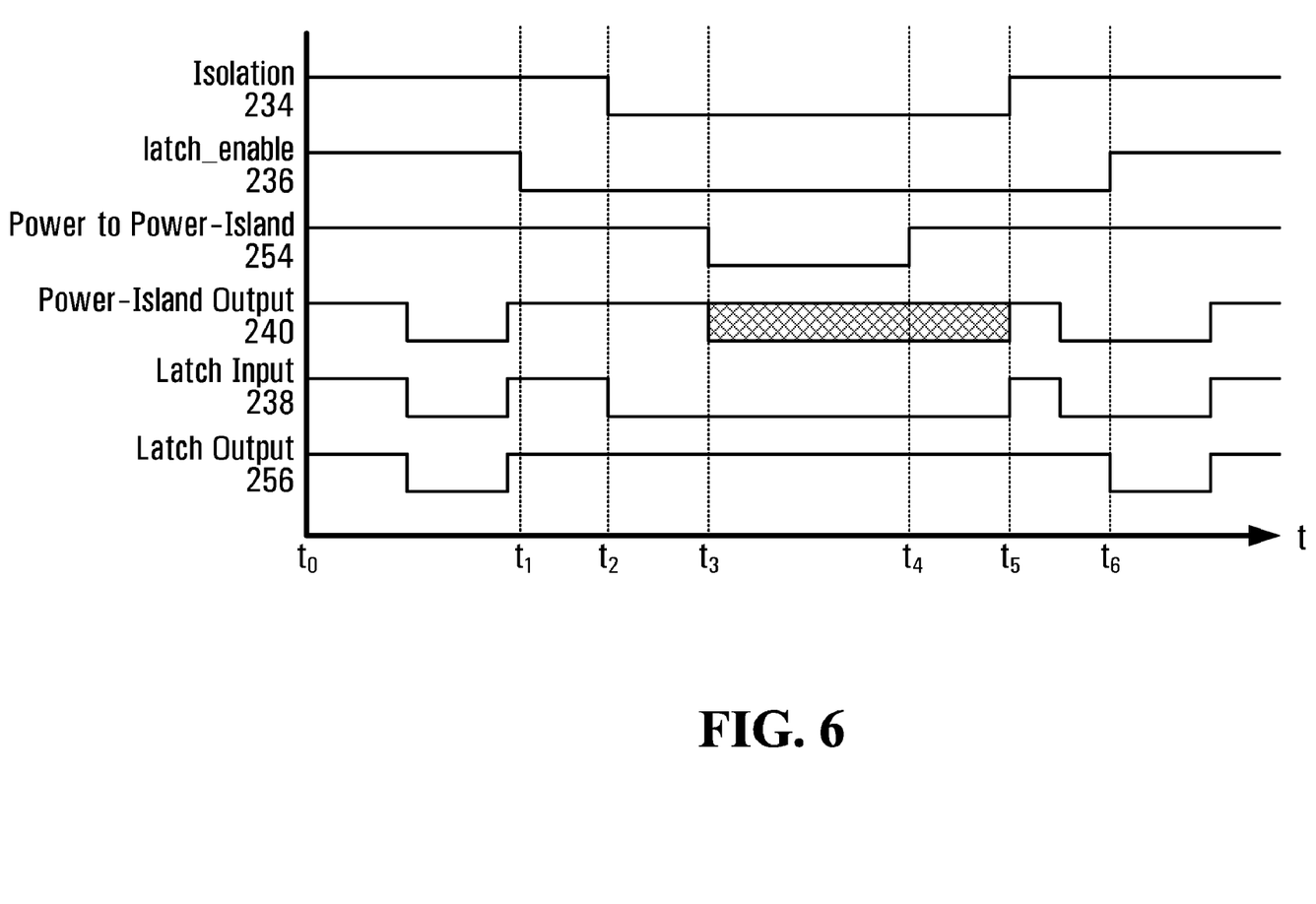
FIG. 6 is a timing diagram illustrating transitions into and out of a low power state operation for the circuit of FIG. 2.

FIG. 6 depicts a timing diagram illustrating signals in circuit 200 as it is transitioned to a low power state having at least one power island 206A disconnected, and then back to a higher power state, with that power-island reconnected. As can be appreciated, in a low power state, circuit 200 will have at least one power-island (e.g. power-island 206A) and possibly all power-islands disconnected from a corresponding power source. Time instants t0, t1, t2, t3, t4, t5 and t6 will be used to describe the state or value of signals in circuit 200. The time interval between time instants t0 and t3 corresponds to steps S400 of FIG. 4; while the time interval between time instants t4 and t6 corresponds to steps S500 of FIG. 5. Of course, each power island 206 may be individually disconnected as described, at different time instants, for which corresponding signals like those depicted at time instants t0, t1, t2, t3, t4 and t5 may be identified. Alternatively, multiple power islands or the entirety of core-logic 202 may be transitioned to a low power state at once.

At time t0, circuit 200 is still in its higher power state (normal operation). At time t1, a LATCH_ENABLE control signal is sent to latch 218A (corresponding to S402 in FIG. 4). At time t1, the output of power-island 206A through signal line 240A, isolation cell 230A, and signal line 238A is latched or stored, and the stored signal level is reflected at the output of latch 218A.

At t2, an ISOLATION signal is transmitted from control block 232 to isolation cell 230A though control line 234A (corresponding to S406 in FIG. 4). As noted above, isolation cell 230A may be an AND-gate and thus ISOLATION signal may be set low to force the output of the gate to be low at line 238A. Alternately, an OR-gate may be used to force the output of isolation cell 230A to a predetermined signal level of high.

The signal level on line 238A which interconnects I/O pads 204, and may also interconnect the rest of core-logic 202, would thus be in a known state as determined by the ISOLATION signal at t2.

At time t3, power to power-island 206A is disconnected (corresponding to S410 in FIG. 4). This does not affect interconnected I/O pads 204 since latch 218A is still powered and the output of latch 218A is maintained in a known state.

For the rest of core-logic 202 interconnected to an output of power-island 206A (such as power-island 206B), isolation cell 230A provides a known signal level at its output on signal line 238A. Thus, transients may be avoided inside circuit 200. Latch 218A prevents glitches that may affect external device 208. Power to power-island 206A may be restored at time t4 (corresponding to S502 in FIG. 5).

Now, recall that isolation cell 230 may be formed as an AND-gate formed from CMOS transistors as depicted in FIG. 3. Input 316 of the AND-gate interconnects transistors 306, 304. When ISOLATION signal on signal line 234 is asserted (i.e., driven low for an AND-gate), the output of isolation cell 230 is clamped low and any leakage path is cut-off even in the presence of a floating input on signal line 240. After power-island 206 is powered, controller 250 may write control information and perform other configurations in power-island 206 (from about t4 to t5 in FIG. 6) to initialize outputs from power-island 206 to a desired state. After the outputs have been initialized to their proper states, ISOLATION signal is de-asserted at t5, which is then followed by transmitting a LATCH_ENABLE signal to make latch 218 transparent.

A floating input signal (i.e., indeterminate signal level that is neither definitely high nor low) to latch 218A may also lead to increased static power consumption in circuit 200. Latch 218A contains complimentary metal oxide semiconductor inverters, each of which includes a PMOS transistor connected in series with an NMOS transistor, with a common input to their gate terminals. A floating input to such CMOS inverter may cause both the NMOS and PMOS transistors (inside latch 218A) to simultaneously turn on thereby dissipating more power. Advantageously, isolation cell 230A ensures that a definite signal level (high or low) is supplied at the input of latch 218A (until the output signal on line 240A is stable) thereby preventing a floating input from propagating to latch 218A.

Referring again to FIG. 6, after some delay, the ISOLATION signal may be de-asserted at time t5 (corresponding to S506 in FIG. 5), to allow outputs of power-island 206A to determine the output of isolation cell 230A. The interval from t4 to t5 may range from nanoseconds to hundreds of microseconds. As can be appreciated, when one input of an AND-gate (isolation cell 230) is set to high, the output of the gate simply reflects the signal level at the second input of the gate. Power-island 206A, thus now effectively drives the output of isolation cell 230A.

At t6, the LATCH_ENABLE control signal to latch 218A may be de-asserted through signal line 236A, by control block 232 (corresponding to S510 in FIG. 5) to allow power-island 206A to ultimately drive signals to interconnected I/O pads 204 and thus to interconnected external devices 208. This restores the normal mode (high power state) of operation. The time interval from t5 to t6 may range from a few clock cycles to hundreds of microseconds depending on how long it takes to restore the state of the power-island outputs, which further depends on factors such as whether state information is stored in volatile or non-volatile memory.

Power-island 206B (and other power islands) may remain powered and fully operational during the period from t0 to t6.

In an alternate embodiment control signal lines 236A, 236B may interconnect latch 218A, 218B directly to controller 250.

In the exemplary embodiment of FIG. 2, only two power-islands 206A, 206B are shown. Of course, in other embodiments, many more power-islands may reside inside core-logic 202.

In FIG. 2, isolation cell 230 in the form of an AND-gate, and latch 218 are shown at the gate level. However, in alternate embodiments, isolation cell 230 (further depicted in FIG. 3) and latch 218 may be combined into a single cell suitable for use in integrated circuits called an isolation latch. Transistor level implementations of isolation cell 230 (FIG. 3) and latch 218 can be easily interconnected to provide a cell that effectively functions as an isolation latch (that is a latch with an isolation circuit built in at its input). The isolation cell contained inside an isolation latch should still have its own control input separate from the control input for the standard latch (inside the isolation cell). Thus, the operation of the isolation latch would be the same as in the case of the embodiment depicted in FIG. 2 where isolation cell 230 is a separate from the standard latch 218.

As already noted, isolation cell 230 may be formed from logic gate structures other than an AND-gate. For example, OR gate structures may be used to clamp the output of an isolation cell to high.

In alternate embodiments, level-shifters may be incorporated into isolation cells. Isolation cells incorporating level-shifters are particularly useful in in multiple voltage-island circuits in which individual islands may be operated using different supply voltage levels.

Circuits exemplary of embodiments of the present invention may be used in graphics chips. For example, logic associated with a 3D engine in a graphics chip may reside in its own power-island. When applications that do not require 3D rendering are used, a host processor may shut down the power-island associated with the 3D engine to conserve power.

Exemplary embodiments of the present invention may also be used in handheld computing devices containing a display peripheral referred to as a smart display peripheral. A smart display peripheral often includes a frame buffer together with a liquid-crystal-display (LCD) array. The smart display peripheral relies on a graphics chip during animation but refreshes itself from its local memory in power saving modes. Thus the graphics chip can shut down its engine and display interface, while the smart display peripheral continues refreshing uninterrupted from its built-in frame buffer.

Other embodiments exemplary of the present invention may also be used circuits employing dynamic RAM (DRAM) controller and associated blocks of DRAM. When such a circuit enters a low power state, the DRAM controller interconnected to DRAM memory blocks may be powered down. After the controller is powered down, its interface signals interconnecting the DRAM blocks may be maintained in a known state using embodiments of the present invention, while the DRAM memory blocks continue to operate in a low power, self-refresh mode.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. An integrated circuit comprising:
   a core-logic providing a core-logic output;
   an isolation circuit in communication with said core-logic, operable to selectively provide an output corresponding to one of said core-logic output and a predetermined value;
   a latch interconnected to said isolation circuit, receiving said output of said isolation circuit;
   a power consumption controller in communication with said core-logic, said latch and said isolation circuit, said controller operable to transition said core-logic to a low power state, and prior to transitioning to said low power state:
      control said latch to store a value of said core-logic output and provide a corresponding output;
      control said isolation circuit to provide an output corresponding to said predetermined value, at said output of said isolation circuit; and
   said power consumption controller further operable to
      transition said core-loqic to a high power state;
      control said isolation circuit to provide an output corresponding to said output of said core-logic in said high power state;
      initialize said core-logic;
      after initializing said core logic, control said latch to provide an output corresponding to said output of said isolation circuit.

2. The circuit of claim 1, wherein said core-logic comprises at least one power-island providing said core-logic output to an input of said isolation circuit, and wherein said controller disconnects power to said at least one power-island to transition said core-logic from said high power state to said low power state.

3. The circuit of claim 2, wherein said core-logic comprises a second power-island having an input receiving said output of said isolation circuit.

4. The circuit of claim 3, wherein while said core-logic is in said low power state, said second power-island remains powered and fully operational.

5. The circuit of claim 3, wherein said core-logic further comprises a plurality of power-islands interconnected with corresponding ones of a plurality of power control switches, each of said switches selectively providing power to a corresponding one of said power-islands.

6. The circuit of claim 1, further comprising a plurality of I/O pads wherein one of said I/O pads is interconnected to an output of said latch.

7. The circuit of claim 1, wherein said isolation circuit comprises one of an AND-gate, an OR-gate, a NOR gate, and a NAND gate.

8. The circuit of claim 7, wherein said latch comprises a p-type metal oxide semiconductor (PMOS) transistor and an n-type metal oxide semiconductor (NMOS) transistor.

9. A graphics processor comprising the circuit of claim 1.

10. A computing device comprising the graphics processor of claim 9.

11. The computing device of claim 10, wherein said computing device is a handheld device comprising a display.

12. A dynamic random access memory (DRAM) controller comprising the circuit of claim 1.

13. A method of operating an integrated circuit comprising a core-logic providing a core-logic output to an isolation circuit operable to selectively provide an output corresponding to one of said core-logic output and a predetermined value, to an input of a latch interconnected with an output of said isolation circuit; said method comprising:
  signaling said latch to store a value of said output of said isolation circuit corresponding to said core-logic output, and provide a corresponding output;
  signaling said isolation circuit to provide an output corresponding to said predetermined value; and
  removing power supplied to at least a portion of said core-logic, thereby placing said integrated circuit in a low power state;
  supplying power to said at least a portion of said core-logic;
  signaling said isolation circuit to provide an output corresponding to said core-logic output to said input of said latch; and
  signaling said latch to provide an output corresponding to said output of said isolation circuit;
  initializing said core-logic prior to said signaling said latch.

14. The method of claim 13, wherein said removing is performed under control of a power consumption controller.

15. The method of claim 13, wherein said supplying is performed by a power consumption controller.

16. The method of claim 13, wherein said portion of said core-logic comprises a power-island and wherein said removing power comprises selectively disconnecting power from said power-island.

17. An integrated circuit comprising a controller in communication with an isolation circuit and a latch;
  said isolation circuit comprising a first input, a second input and an output for selectively providing an output signal corresponding to an input signal received at said first input or a predetermined signal value, in response to a signal received at said second input;
  said latch comprising a data input interconnected to said output of said isolation circuit for receiving a data signal, a control input for receiving a control signal and an output;
  said controller operable to, in a high power state of said integrated circuit:
    assert said control signal to control said latch to store a value of said data signal, and output a corresponding signal; and
    signal said isolation circuit to provide an output signal corresponding to said predetermined signal value;
  said controller further operable to, in a low power state of said integrated circuit:
    initialize at least a portion of said integrated circuit providing said data signal;
    signal said isolation circuit to provide an output signal corresponding to said input signal received at said first input,
    de-assert said control signal to control said latch to provide an output corresponding to said data signal.

18. The circuit of claim 17, wherein said isolation circuit is an AND-gate.

19. The circuit of claim 17, wherein said isolation circuit is an OR-gate.

20. The circuit of claim 17, wherein said isolation circuit comprises CMOS transistors.

21. An integrated circuit comprising:
  a core-logic providing a core-logic output;
  a latch to selectively latch a state of the core-logic output, or follow a current state of the core-logic output;
  an isolation circuit interposed between said core-logic and said latch, to selectively connect said core-logic output to said latch;
  a power consumption controller in communication with said core-logic, said latch and said isolation circuit, said controller operable to
    transition at least a portion of said integrated circuit between high and low power states;
    control said isolation circuit to isolate said latch from said core logic, when said core logic is in a low power state;
    initialize said core-logic to transition from said low power state to a high power state;
    cause said latch to follow a current state of said core-logic output only after said core-logic has been initialized.

22. The integrated circuit of claim 21, wherein said portion of said core-logic comprises a power-island and wherein said transition to between high and low power states comprises selectively providing and removing power applied to said power-island.

23. The integrated circuit of claim 21, wherein said isolation circuit comprises one of an AND-gate, an OR-gate, a NOR gate, and a NAND gate.

* * * * *

UNITED STATES PATENT AND TRADEMARK OFFICE
CERTIFICATE OF CORRECTION

PATENT NO. : 7,904,838 B2
APPLICATION NO. : 11/839245
DATED : March 8, 2011
INVENTOR(S) : Aris Balatsos et al.

It is certified that error appears in the above-identified patent and that said Letters Patent is hereby corrected as shown below:

In the Claims

In claim 1, column 10, line 40, "transition said core-loqic to a high power states" should appear as
--transition said core-logic to a high power states--

Signed and Sealed this
Twenty-ninth Day of October, 2013

Teresa Stanek Rea
*Deputy Director of the United States Patent and Trademark Office*